Dec. 13, 1932.        G. STENGLEMEIR        1,890,550
LUBRICATED STRUCTURE
Filed April 20, 1932

Inventor
George Stenglemeir,

By Clarence A. O'Brien
Attorney

Patented Dec. 13, 1932

1,890,550

UNITED STATES PATENT OFFICE

GEORGE STENGLEMEIR, OF WOODWARD, OKLAHOMA

LUBRICATED STRUCTURE

Application filed April 20, 1932. Serial No. 606,448.

My invention relates to lubricated structures, and particularly to a pitman or connecting rod connection to a rotatable member, the member being equipped to self-lubricate the connections.

It is an important object of my invention to provide a self-lubricating connection of this type which insures at all times a complete and satisfactory lubrication of the parts.

It is also an important object of my invention to provide a structure of this type which maintains the constant lubrication of the connected parts through the employment of a rotating reservoir containing the lubricant and functioning by virtue of its rotation to feed the lubricant at the desired rate to the parts to be lubricated.

Other objects and advantages of my invention will be apparent from a reading of the following description in connection with the drawing, wherein for purposes of illustration I have shown a preferred embodiment of the invention.

In the drawing:—

Figure 1:
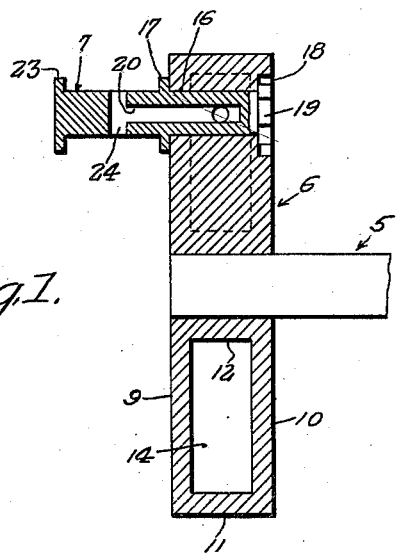
Figure 1 is a transverse vertical sectional view through the embodiment.
Figures 2, 3:
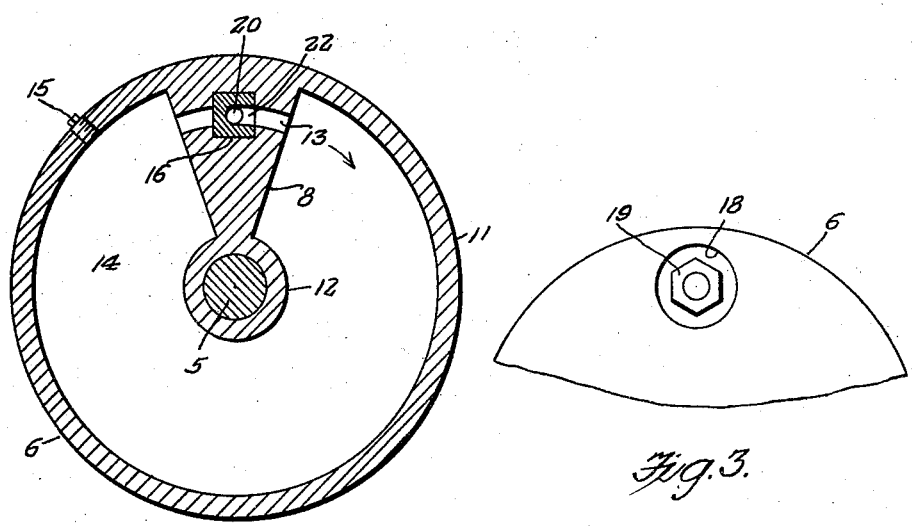
Figure 2 is a sectional view taken at right angles to Figure 1.
Figure 3 is an elevational view of the upper part of the rotatable member taken from the right of Figure 1.

Referring in detail to the drawing, wherein like numerals refer to like parts throughout the same, the numeral 5 generally designates a rotating shaft, such as a drive shaft, or crank shaft, or the like upon which is mounted in fixed manner the flywheel 6 carrying the wrist-pin or the like 7.

The flywheel 6 is constructed hollow to a point near its center whereby to provide an arcuate chamber therein and practically coextensive therewith except for a solid segmental portion 8 arranged in radial manner therein. The resulting recess is defined by the relatively thin side walls 9, 10, the peripheral wall 11, and the hub portion 12, as well as by the segmental solid portion 8.

The segmental portion 8 is provided with a circumferential passage 13 whereby to communicate with the recess 14 at both sides of the solid segment 8. Lubricant is placed into the recess 14 through an opening in the peripheral wall 11 which is adapted to be closed by a screw plug 15 of removable character.

A wrist pin having a squared shank portion 16 is placed through an opening of corresponding formation in the radially outward end portion of the segment 8 so that a shoulder 17 bears against one side of the flywheel 6, while the other end portion of the shank 16 projects into a suitable countersink or the like formation 18 at the opposite side of the flywheel, where the shank is screw-threaded to receive the lock nut 19 for maintaining it connected to the flywheel in the disposition described. The shank portion of the wrist-pin 7 is provided with a longitudinal passage 20 and a lateral passage 22 communicated therewith. The disposition of the passage 22 is such that it communicates and registers with the passage 13 in the segment 8. By this arrangement it will be obvious that lubricant coming into the passage 13 from the reservoir 14 will be forcibly moved into the longitudinal passage 20 of the wrist-pin as the flywheel rotates in the direction of the opening of the lateral passage 22.

The outward end of the wrist-pin is provided with a confining shoulder 23 similar to the shoulder 17, whereby to confine on the wrist-pin a pitman bearing or connecting rod bearing in an obvious manner. Intermediate the shoulders 17, 23 there is provided a transverse passage 24 which is communicated with the longitudinal passage 20. It is obvious that the transverse passage 24 will communicate the lubricant coming through the passage 20 to the bearing surface of the wrist-pin and suitably lubricate the juncture of the piston bearing or connecting rod bearing and the wrist-pin.

The passages described may be so related as to size that a proper and sufficient amount of lubricant will be fed. Speed of rotation of the parts and the character of the lubricant should also be taken into consideration. In any event, the provision of my invention is such that the wrist-pin will be continually and constantly lubricated to the proper degree until the supply of lubricant in the recess 14 in the flywheel is exhausted. It is easy to fill the recess 14 with lubricant by means of the opening closed by the removable screw plug 15.

Though I have shown and described herein a preferred embodiment of the invention, it is to be definitely understood that I do not desire to limit the application of the invention thereto, but any change or changes may be made in material and structure and arrangement of parts consistent with the spirit of the invention and the scope of the subjoined claims.

It will be observed that the rotation of the flywheel and the consequent movement of the solid segment 8 will keep the lubricant within the flywheel continually moved so that it will be fed to the passage 13. In such machines as mowers, where it is ordinarily necessary to lubricate the connections and moving parts by hand because of the liability to clogging which obtains in the case of the ordinarily used lubricating means because of the ever-present dirt and dust and sand, these impurities are excluded to a serviceable extent where the structure of my invention is employed.

What is claimed is:—

1. A rotatable member comprising a hollow casing constituting a lubricant reservoir, a radial partition member in the casing having a circumferentially extending passage opening at each side of the partition, a wrist-pin traversing the flywheel and said partition member at the passage, a lubricant duct extending longitudinally in the wrist-pin having a lateral extension at one side communicable with the passage.

2. A flywheel comprising a rotatable body, a lubricant reservoir in the body and surrounding the center portion thereof, a radial partition extending from one side of the center portion and partitioning the reservoir, a circumferentially arranged passage through the partition outward of the center fed by the reservoir, a bore traversing the body through the partition and communicating with the said passage, a wrist pin traversing the body and in said bore, a radial duct in the wrist-pin communicating with one side of the said passage, said pin being capable of being adjusted to communicate said duct with either side of the passage for accommodating rotation of the body in either direction, and a longitudinal duct in the wrist-pin leading from the radial duct, and surface lubricating means in the wrist-pin outward of the body fed by the longitudinal duct.

3. A lubricator structure comprising a hollow rotatable body, an interior radial partition in the body having an opening extending to each side of the partition for receiving lubricant contained in the body, a wrist pin placed through a wrist pin opening extending through both sides of the body and through the partition, a flange on the wrist pin for engaging one side of the body, a nut threaded on the wrist pin for engaging the other side of the body, said wrist pin having a longitudinal chamber therein having communication means registerable with one side of the lubricant receiving opening and surface lubricating means fed by the chamber.

4. A lubricator structure comprising a hollow rotatable body, an interior radial partition in the body having an opening extending to each side of the partition for receiving lubricant contained in the body, a wrist pin placed through a wrist pin opening extending through both sides of the body and through the partition, a flange on the wrist pin for engaging one side of the body, a nut threaded on the wrist pin for engaging the other side of the body, said wrist pin having a longitudinal chamber therein having communication means registrable with one side of the lubricant receiving opening, and surface lubricating means fed by the chamber, said wrist pin opening and the portion of the wrist received therein being squared, thereby affording means for exactly reversing the position of the chamber communication means and registering the same with either side of the lubricant receiving opening according to the direction of rotation of the rotatable body.

5. A lubricator structure comprising a hollow rotatable body, an interior radial partition in the body having an opening extending through each side of the partition for receiving lubricant contained in the body, a wrist pin placed through a wrist pin opening extending through both sides of the body and through the partition, a flange on the wrist pin for engaging one side of the body, a nut threaded on the wrist pin for engaging the other side of the body, said wrist pin having a longitudinal chamber therein having communication means registrable with one side of the lubricant receiving opening and surface lubricating means fed by the chamber, said partition being of segmental form so as to give length to the lubricant receiving opening and afford support for the wrist pin.

In testimony whereof I affix my signature.

GEORGE STENGLEMEIR.